United States Patent
Sarda

(10) Patent No.: US 12,244,408 B2
(45) Date of Patent: *Mar. 4, 2025

(54) FSYNC MISMATCH TRACKING

(71) Applicant: Skyworks Solutions, Inc., Irvine, CA (US)

(72) Inventor: Vivek Sarda, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,998

(22) Filed: Dec. 7, 2023

(65) Prior Publication Data

US 2024/0223294 A1 Jul. 4, 2024

Related U.S. Application Data

(63) Continuation of application No. 17/986,704, filed on Nov. 14, 2022, now Pat. No. 11,876,607, which is a
(Continued)

(51) Int. Cl.
*H04J 3/06* (2006.01)
(52) U.S. Cl.
CPC ............ *H04J 3/065* (2013.01); *H04J 3/0605* (2013.01); *H04J 3/0617* (2013.01)
(58) Field of Classification Search
CPC ...... G06F 13/4291; G06F 1/08; G06F 13/364; H04J 2203/0062; H04L 1/242;
(Continued)

(56) References Cited

U.S. PATENT DOCUMENTS 5,140,611 A 8/1992 Jones
5,509,038 A 4/1996 Wicki
(Continued)

FOREIGN PATENT DOCUMENTS

CN 102291233 A 12/2011
CN 103684727 A 3/2014
(Continued)

OTHER PUBLICATIONS

Broadcom Corp., "Ethernet Time Synchronization Providing Native Timing Within the Network", White Paper, Oct. 2008, 36 pages.
(Continued)

*Primary Examiner* — Jung Liu
(74) *Attorney, Agent, or Firm* — Knobbe, Martens, Olson & Bear, LLP

(57) ABSTRACT

A baseline difference is determined between a slave line card time stamp corresponding to a slave line card frame sync signal and a master line card time stamp corresponding to a master line card frame sync signal. The slave line card generates subsequent slave line card time stamps for subsequent slave line card frame sync signals and the master line card generates subsequent master line card time stamps for subsequent master line card frame sync signals. Current differences are determined between subsequent slave line card time stamps and the subsequent master line card time stamps and the current differences are compared to the baseline difference. When a mismatch difference occurs (current difference differs from the baseline difference), the mismatch difference causes a phase-locked loop in the master line card to be adjusted or an offset to be provided to the master line card time of day counter.

19 Claims, 6 Drawing Sheets

Related U.S. Application Data continuation of application No. 17/134,818, filed on Dec. 28, 2020, now Pat. No. 11,502,764.

(58) Field of Classification Search
CPC ..... H04L 1/244; H04L 12/26; H04L 12/2697; H04L 43/50; H04Q 1/20; H04Q 11/045
See application file for complete search history.

(56) References Cited

U.S. PATENT DOCUMENTS

| | | | | |
|---|---|---|---|---|
| 5,644,604 | A | 7/1997 | Larsen | |
| 5,964,880 | A * | 10/1999 | Liu | G06F 1/12 713/401 |
| 6,549,046 | B1 | 4/2003 | Klecka, III | |
| 6,760,586 | B1 | 7/2004 | Lee | |
| 6,839,858 | B1 | 1/2005 | James et al. | |
| 6,885,647 | B1 | 4/2005 | Chung et al. | |
| 7,002,996 | B1 | 2/2006 | Dougherty et al. | |
| 7,079,589 | B1 | 7/2006 | Maksimovic et al. | |
| 7,116,743 | B1 | 10/2006 | Wang | |
| 7,203,227 | B1 | 4/2007 | Currivan et al. | |
| 7,417,510 | B2 | 8/2008 | Huang | |
| 7,451,337 | B1 | 11/2008 | Hewitt | |
| 7,451,339 | B2 | 11/2008 | Smith, Sr. | |
| 7,535,893 | B1 | 5/2009 | Beladakere et al. | |
| 7,860,205 | B1 * | 12/2010 | Aweya | H04J 3/0664 713/400 |
| 7,903,681 | B2 | 3/2011 | Roberts et al. | |
| 8,355,476 | B2 | 1/2013 | Lee et al. | |
| 8,942,561 | B2 | 1/2015 | Boyd et al. | |
| 9,246,615 | B2 | 1/2016 | Ellegard et al. | |
| 9,369,270 | B1 | 6/2016 | Spijker | |
| 9,426,762 | B2 | 8/2016 | Ehlers et al. | |
| 9,479,182 | B1 | 10/2016 | Baidas et al. | |
| 9,594,396 | B2 | 3/2017 | Turner et al. | |
| 9,628,255 | B1 | 4/2017 | Baidas et al. | |
| 9,665,121 | B2 * | 5/2017 | Aweya | G06F 1/10 |
| 9,825,724 | B2 * | 11/2017 | Licardie | H04J 3/0658 |
| 9,860,004 | B2 | 1/2018 | Joergensen et al. | |
| 9,960,873 | B2 | 5/2018 | Yang et al. | |
| 10,007,639 | B2 * | 6/2018 | Mitric | G06F 13/364 |
| 10,067,478 | B1 | 9/2018 | Kolar Ranganathan | |
| 10,075,284 | B1 | 9/2018 | Rodrigues et al. | |
| 10,084,559 | B1 | 9/2018 | Devineni et al. | |
| 10,158,444 | B1 | 12/2018 | Darras | |
| 10,511,312 | B1 | 12/2019 | Pastorello et al. | |
| 10,536,258 | B2 | 1/2020 | Choo et al. | |
| 10,594,423 | B1 | 3/2020 | Anand et al. | |
| 10,715,307 | B1 | 7/2020 | Jin | |
| 10,727,845 | B1 | 7/2020 | Balakrishnan | |
| 10,797,686 | B1 | 10/2020 | Terstrup et al. | |
| 10,917,097 | B1 | 2/2021 | Meyer et al. | |
| 10,951,216 | B1 | 3/2021 | Barnette et al. | |
| 11,061,432 | B2 | 7/2021 | Sarda | |
| 11,088,816 | B1 * | 8/2021 | Sarda | H04L 7/0037 |
| 11,088,819 | B1 * | 8/2021 | Sarda | H04L 7/0037 |
| 11,502,764 | B2 | 11/2022 | Sarda | |
| 11,876,607 | B2 | 1/2024 | Sarda | |
| 2006/0020733 | A1 | 1/2006 | Sarda | |
| 2006/0280182 | A1 | 2/2006 | Williams | |
| 2007/0046516 | A1 | 3/2007 | Dornbusch | |
| 2008/0080563 | A1 | 4/2008 | Kataria | |
| 2008/0240169 | A1 | 10/2008 | Cui et al. | |
| 2008/0294276 | A1 * | 11/2008 | Nakayama | H04L 12/437 700/94 |
| 2009/0024865 | A1 | 1/2009 | Fugaro | |
| 2009/0168808 | A1 | 7/2009 | Cho | |
| 2009/0251226 | A1 | 10/2009 | Kathuria et al. | |
| 2010/0118894 | A1 | 5/2010 | Aweya et al. | |
| 2011/0099408 | A1 * | 4/2011 | Yin | H04L 7/02 713/400 |
| 2011/0099410 | A1 * | 4/2011 | Yin | H03L 7/06 713/503 |
| 2011/0296226 | A1 | 12/2011 | Sorbara et al. | |
| 2012/0300795 | A1 | 11/2012 | Joergensen | |
| 2012/0319734 | A1 | 12/2012 | Nagaraj | |
| 2013/0121347 | A1 | 5/2013 | Saito et al. | |
| 2014/0068315 | A1 | 3/2014 | Aweya et al. | |
| 2014/0192797 | A1 * | 7/2014 | Licardie | H04J 3/0658 370/350 |
| 2014/0320181 | A1 | 10/2014 | Mitric | |
| 2015/0092797 | A1 | 4/2015 | Aweya | |
| 2015/0185759 | A1 | 7/2015 | Hinderer et al. | |
| 2015/0200770 | A1 | 7/2015 | Rahbar et al. | |
| 2015/0207620 | A1 | 7/2015 | Colby | |
| 2015/0215031 | A1 * | 7/2015 | Dalvi | H04B 7/18578 370/324 |
| 2015/0222276 | A1 | 8/2015 | Milijevic | |
| 2016/0170439 | A1 | 6/2016 | Aweya | |
| 2016/0182217 | A1 | 6/2016 | Hashizume | |
| 2017/0135053 | A1 | 5/2017 | Shenoi et al. | |
| 2017/0288801 | A1 | 10/2017 | Aweya | |
| 2017/0373824 | A1 | 12/2017 | Mitchler | |
| 2019/0020333 | A1 | 1/2019 | Koch et al. | |
| 2019/0036804 | A1 | 1/2019 | Mihelic et al. | |
| 2019/0379474 | A1 | 12/2019 | Coulter | |
| 2019/0379475 | A1 | 12/2019 | Seethamraju | |
| 2020/0021379 | A1 | 1/2020 | Aweya | |
| 2020/0028666 | A1 | 1/2020 | Goldin et al. | |
| 2020/0050575 | A1 | 2/2020 | Mishra | |
| 2020/0127752 | A1 | 4/2020 | Tai et al. | |
| 2020/0285265 | A1 | 9/2020 | Ranganathan et al. | |
| 2021/0297083 | A1 | 9/2021 | Nishikawa | |

FOREIGN PATENT DOCUMENTS

| | | | |
|---|---|---|---|
| CN | 104378193 | A | 2/2015 |
| CN | 107294634 | A | 10/2017 |
| WO | WO 2015/003364 | A1 | 1/2015 |

OTHER PUBLICATIONS

Eidson, "IEEE-1588 Standard for a Precision Clock Synchronization Protocol for Networked Measurement and Control Systems," Agilent Technologies, 2005, 94 pages.

Gallant, "Practical Implementation of a IEEE 1588 Based Synchronization Distribution System," Silicon Laboratories, WSTS, Jun. 19, 2018, 15 pages.

International Telecommunication Union, G.8273/Y. 1368 (2018)—Amendment 1, Framework of phase and time clocks, ITU-T, Mar. 2020, 38 pages.

NXP Semiconductors, AN-12149, Implementing an IEEE 1588 V2 on i.MX RT Using PTPd, FreeRTOS, and lwIP TCP/IP stack, Sep. 2018, 28 pages.

Renesas, "Synchronization Management Unit," 8A34002 Datasheet, Renesas Electronics Corporation, Sep. 8, 2020, 107 pages.

Renesas, 82P33831, Synchronization management Unit for IEEE 1588 and 10G/40G/100G Synchronous Ethernet, Jul. 10, 2018, 75 pages.

Renesas, AN-1033, "Delay Variation Measurement and Compensation", Application Note, Feb. 8, 2019, 13 pages.

Renesas, AN-950, "82P338XX/9XX Usage of a SYNC Input for Clock Alignment", Application Note, Nov. 10, 2016, 13 pages.

Stanton, 802.1AS Tutorial, Intel Corporation, Nov. 13, 2008, 42 pages.

U.S. Appl. No. 16/836,706, filed Mar. 31, 2020, entitled "Secondary Phase Compensation Assist for PLL IO Delay," by Vivek Sarda.

U.S. Appl. No. 16/693,559, filed Nov. 25, 2019, entitled "Data Handoff Between Two Clock Domains Sharing a Fundamental Beat," by Vivek Sarda.

U.S. Appl. No. 16/849,036, filed Apr. 15, 2020, entitled "Phase Transport with Frequency Translation Without a PLL," by Vivek Sarda.

U.S. Appl. No. 16/836,713, filed Mar. 31, 2020, entitled "Secondary Phase Compensation Assist for PLL IO Delay Aligning Sync Signal to System Clock Signal," by Vivek Sarda.

(56) References Cited

OTHER PUBLICATIONS

U.S. Appl. No. 17/375,634, filed Jul. 14, 2021, entitled "Data Protocol Over Clock Line," by Vivek Sarda.

\* cited by examiner

FSYNC MISMATCH TRACKING

CROSS-REFERENCE TO RELATED APPLICATIONS

This application is a continuation of U.S. application Ser. No. 17/986,704, filed Nov. 14, 2022, entitled "FSYNC MISMATCH TRACKING," which is a continuation of U.S. application Ser. No. 17/134,818, filed Dec. 28, 2020, entitled "FSYNC MISMATCH TRACKING." Each of the foregoing applications are incorporated herein by reference in their entirety.

BACKGROUND

Field

This disclosure relates to network timing and more particularly to reducing errors in network timing signals.

Description of the Related Art

Network communication boxes use timing protocols to ensure time of day (ToD) counters in the network are synchronized. Frame sync (FSYNC) signals are used to update time of day counters at the same time in the network. Any delay/offset and process, voltage, temperature (PVT) variation between the FSYNC signals being supplied to the ToD counters in each line card in the network box results in an error that is classified as Continuous Time Error (CTE). By way of example, the CTE budget for a network box is 5 ns for Class D type network boxes. Reducing sources of timing error in network boxes would give greater flexibility to designers to meet the CTE budget.

SUMMARY OF EMBODIMENTS

Accordingly, in one embodiment an apparatus includes a master line card that includes a master line card time of day counter, a phase-locked loop supplying a master timing card clock signal from which a plurality of master line card frame sync signals are generated. Each of the master line card frame sync signals indicates when a roll over event for the master line card time of day counter occurs. The master line card further includes a master line card time stamp circuit to provide a plurality of master line card time stamps corresponding to the plurality of master line card frame sync signals. The apparatus further includes a slave line card that includes a slave line card time of day counter and a slave line card time stamp circuit that generates a plurality of slave line card time stamps corresponding to a plurality of slave line card frame sync signals generated on the slave line card. Each of the slave line card frame sync signals indicates when a roll over event for the slave line card time of day counter occurs. Compare logic compares one of the plurality of slave line card time stamps and one of the plurality of master line card time stamps and generates a baseline difference. The compare logic is configured to generate a second difference based on comparison between a second of the plurality of slave line card time stamps and a second one of the plurality of master line card time stamps. Control logic is responsive to the baseline difference not being equal to the second difference, to generate a mismatch difference indicative of a difference between the baseline difference and the second difference and to compensate for the mismatch difference.

In another embodiment a method includes generating a plurality of slave line card time stamps for a respective plurality of slave line card frame sync signals generated on a slave line card. A master line card generates a plurality of master line card time stamps for a respective plurality of master line card frame sync signals. One of the plurality of slave line card time stamps is compared to one of the plurality of master line card time stamps to generate a baseline difference. A second difference is generated based on a comparison of a second of the plurality of slave line card time stamps to a second of the plurality of master line card time stamps. The second difference not being equal to the baseline difference is compensated for by adjusting at least one timing aspect of the master line card. In an embodiment, the phase-locked loop in the master line card is adjusted based on a difference between the second difference and the baseline difference, the one timing aspect being associated with the phase-locked loop. In another embodiment, the second difference not being equal to the baseline difference is compensated for by providing an offset to a time of day counter on the master line card, the offset corresponding to the difference between the second difference and the baseline difference, the one timing aspect being the offset.

In another embodiment a method includes generating a baseline difference between occurrence of a first slave line card frame sync signal on a slave line card and a first master line card frame sync signal on a master line card. A second difference is generated between occurrence of a second slave line card frame sync signal and a second master line card frame sync signal. The method further includes adjusting at least one aspect of the master line card to compensate for the second difference not being equal to the baseline difference.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
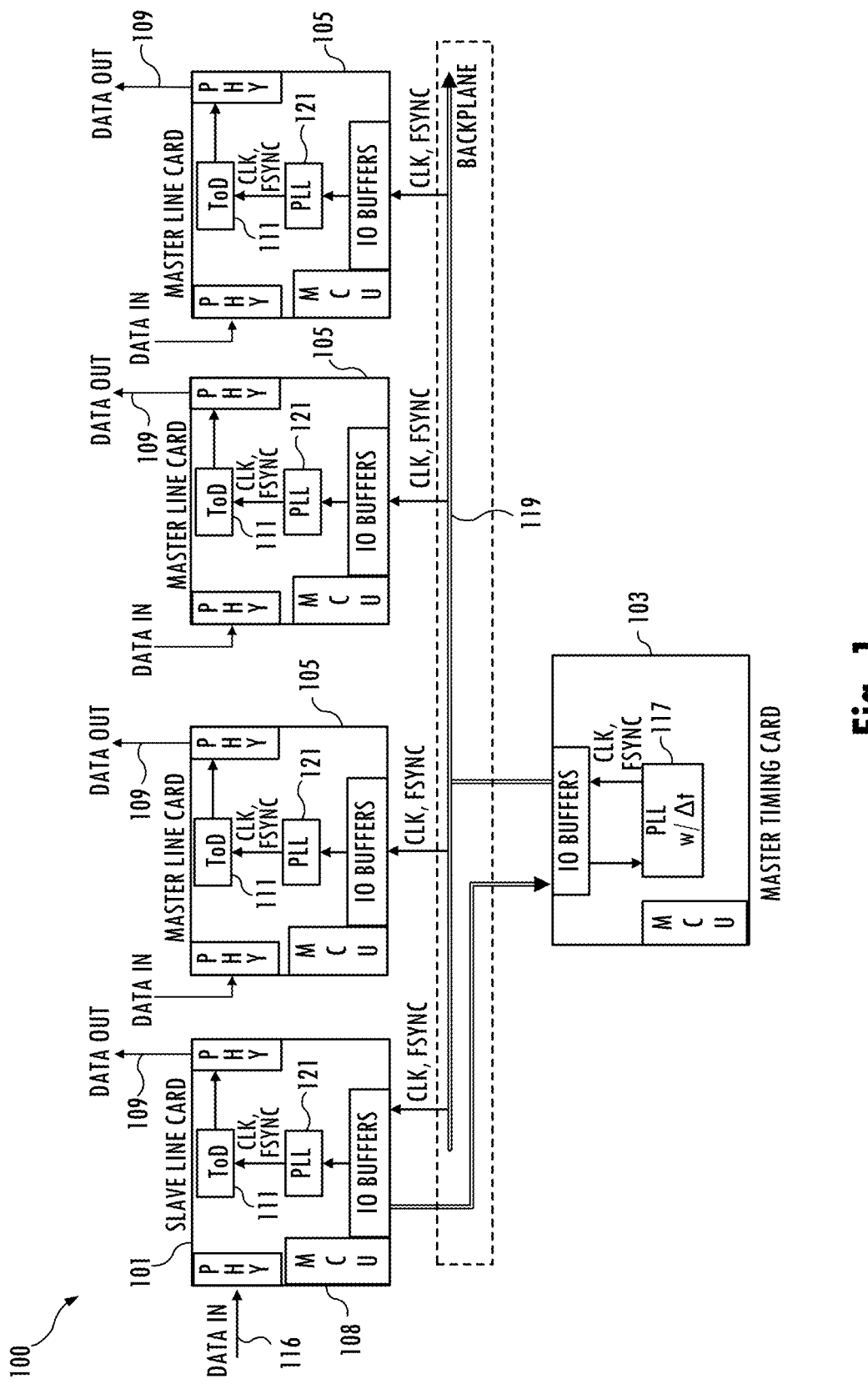
FIG. 1 illustrates a typical architecture of network communication box with a slave line card, a master timing card, and multiple master line cards.

FIG. 1 illustrates a typical architecture of network communication box 100 with a slave line card (LC) 101, a master timing card (TC) 103, and multiple master line cards 105. Embodiments can have, e.g., 64 master line cards. The data_out 109 from each line card is time stamped using time stamps from local time of day (ToD) counters 111. The slave line card 101 receives timing information from a selected one of a plurality of incoming data streams on data_in 116 that provides the network time of day to which the communication system 100 maintains alignment.

The master timing card 103 supplies a global FSYNC signal and system clock signal (CLK) to the slave line card 101 generated using PLL 117 and dividers (not shown). The FSYNC signal is also referred to as the SYNC signal in certain contexts as the signal can have different names (SYNC or FSYNC) at the integrated circuit level inside the network box or system level. The signal will be referred to as the FSYNC signal herein for ease of reference. The global FSYNC signal can be embedded inside a serial stream, e.g., in the CLK signal, which conveys the position of the global FSYNC edge through a pulse width modulation of the CLK signal or other data transfer methods. The master timing card 103 supplies the CLK and global FSYNC signal to all of the master line cards 105 over backplane 119. The global FSYNC signal is a global signal inside the network system box 100 that signifies the right moment/edge for the Time of Day (ToD) counters 111 to rollover. The time of day counters maintain the date and time. The global FSYNC signal has a frequency range of, e.g., 16 kHz to pp2s (pulse per 2 seconds). In many network systems the FSYNC signal is 1 pulse per second (1PPS). FSYNC is generally an integer divided down and edge aligned version of the system clock signal CLK. The global FSYNC output from the master timing card 103 is used by all the line cards for their ToD rollover alignment. The various ToD counters 111 contain the same value and turnover at the same time based on the global FSYNC signal. Each of the line cards 101 and 105 generate a local FSYNC signal by dividing the CLK generated by PLL 121 in a divider (not shown in FIG. 1) to the desired frequency, e.g., 1 PPS that should be aligned to the global FSYNC signal.

One challenge in a network communication box is to keep the ToD on the slave line card aligned with the network timestamps from the incoming data stream. That is accomplished by deriving the exact position of the FSYNC edge using a precision time protocol (PTP) servo loop that uses the time information inside the incoming packet stream on data_in 116 to the slave line card 101. Another challenge is to keep the ToD counters across different line cards in perfect alignment over process, voltage, and temperature (PVT) so that the time stamps indicating the ToD sent with the data_out 109 from the master line cards are always aligned with each other and the incoming network time. That is, the time stamps sent with the master line card data out should reflect the current network time of day.

Figure 2:
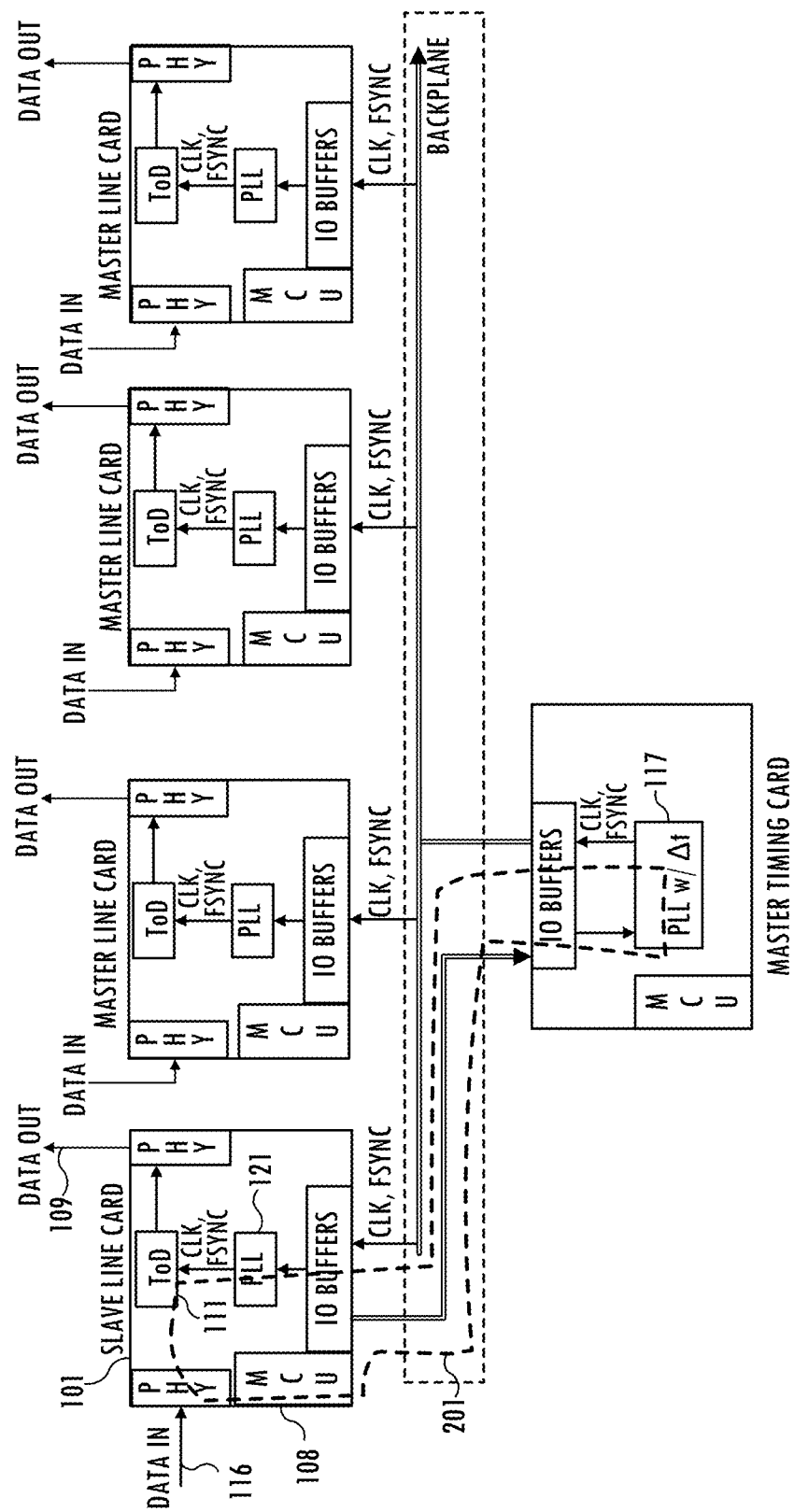
FIG. 2 illustrates the closed loop utilized to keep the slave line card aligned with the timing of the incoming data stream.

As mentioned above, the slave line card ToD should be identical to the time provided by the incoming data stream. FIG. 2 illustrates that the slave line card 101 uses a closed loop 201 to keep the slave line card aligned with the timing of the incoming data stream. The selected input data stream, the slave line card 101, and the master timing card 103 operate in a Precision Time Protocol (PTP)/1588 closed loop to maintain alignment between the ToD and the Grandmaster time. The master timing card provides the clock signal (CLK) and the global frame sync (FSYNC) signal that are adjusted to maintain the alignment. The Grandmaster (the selected input data stream) provides time stamps that the MCU 108 on the slave line card 101 compares to the ToD on the slave line card and provides any necessary phase and frequency adjustments to the PLL 117 on the master timing card to adjust CLK and FSYNC signal (as indicated by Δt) to compensate for any differences in the slave line card timing and Grandmaster timing. The PLL 121 in the slave line card is locked to the PLL in 117 using global FSYNC and the CLK signal as the reference clock and global FSYNC provided to the backplane indicates when the edge of the local FSYNC signal should occur. The PLL 117 is in turn locked using the PTP loop to the network timing of the GrandMaster. The FSYNC signal is used to indicate when a rollover, e.g., of a particular bit of the ToD counter should occur after, e.g., each 1 second interval.

There are fixed delays associated with the backplane and the circuits of the slave line card 101 and the master timing card 103 and the signal lines between them. Those fixed delays can be calibrated out in test. In addition, the PTP/1588 closed loop system adjusts the CLK and FSYNC pair generated by the master timing card 103 such that the slave line card ToD remains aligned with the network time of the chosen incoming data_in stream using adjustments based the PTP/1588 loop algorithm.

Figure 3:
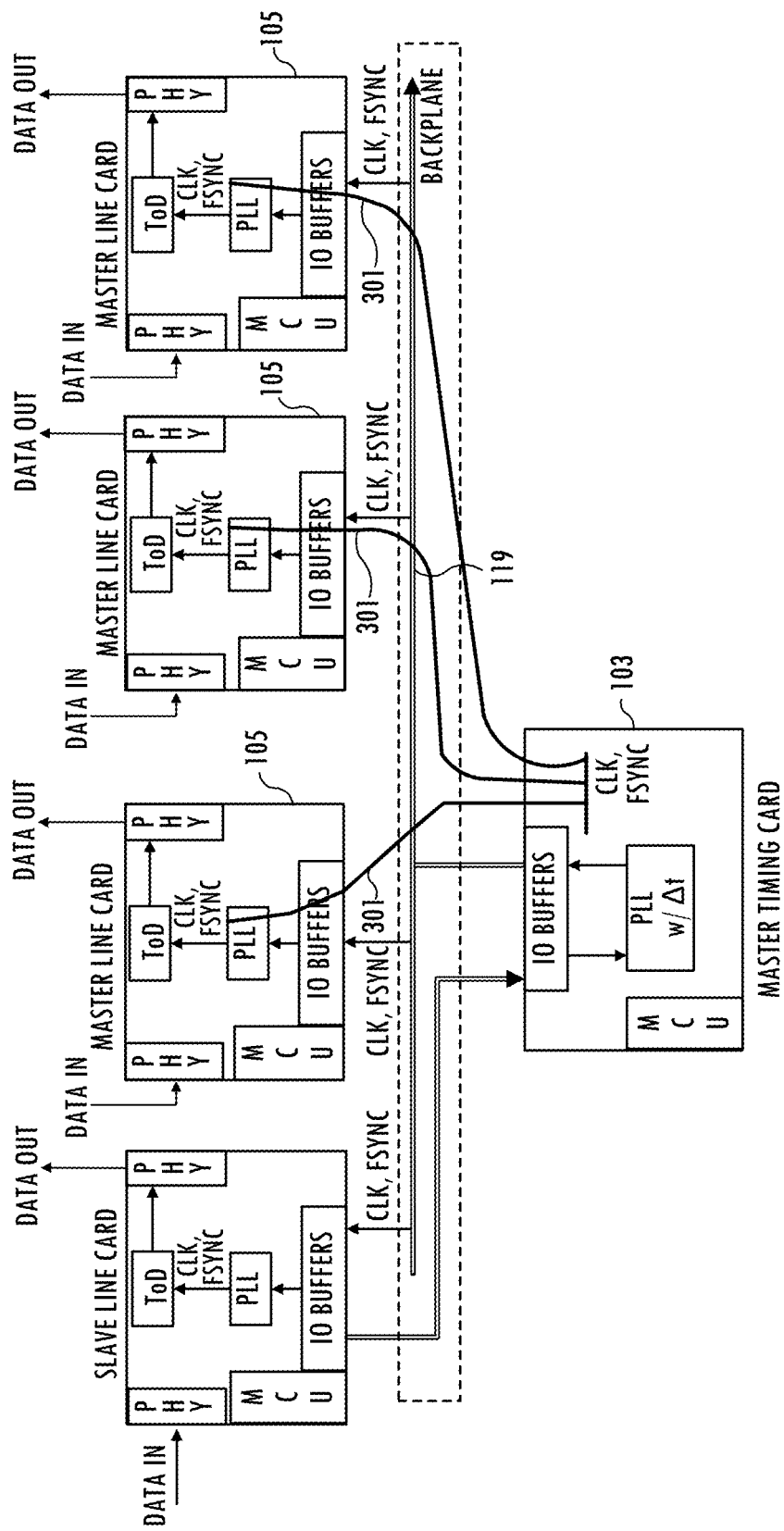
FIG. 3 illustrates that the FSYNC and CLK signal are distributed open loop to the master timing cards.

The master timing card CLK/FSYNC pair is globally distributed over the backplane 119 to all of the master line cards 105. While the slave line card is closed loop and continuously corrected by adjusting the master timing card PLL 117, the CLK/FSYNC pair distribution is open loop to the master line cards 105 as illustrated by 301 in FIG. 3. Thus, the master line cards have delay mismatch with the slave line card due to temperature variation, especially real time temperature variation that has not been calibrated out at manufacturing or test. The master line cards have process, voltage, and temperature coefficient differences. In addition, the temperature of the line cards can vary inside the communications box 100 depending on location. While fixed mismatches can be calibrated out at test after careful design and manufacturing (process and voltage variations), temperature variation mismatch accounts for the bulk of the network time error between the line cards that cannot be easily calibrated out. Since line cards, and their components have different temperature coefficients and line card temperature varies over time and within the box, such temperature change over time causes CTE.

Figure 4:
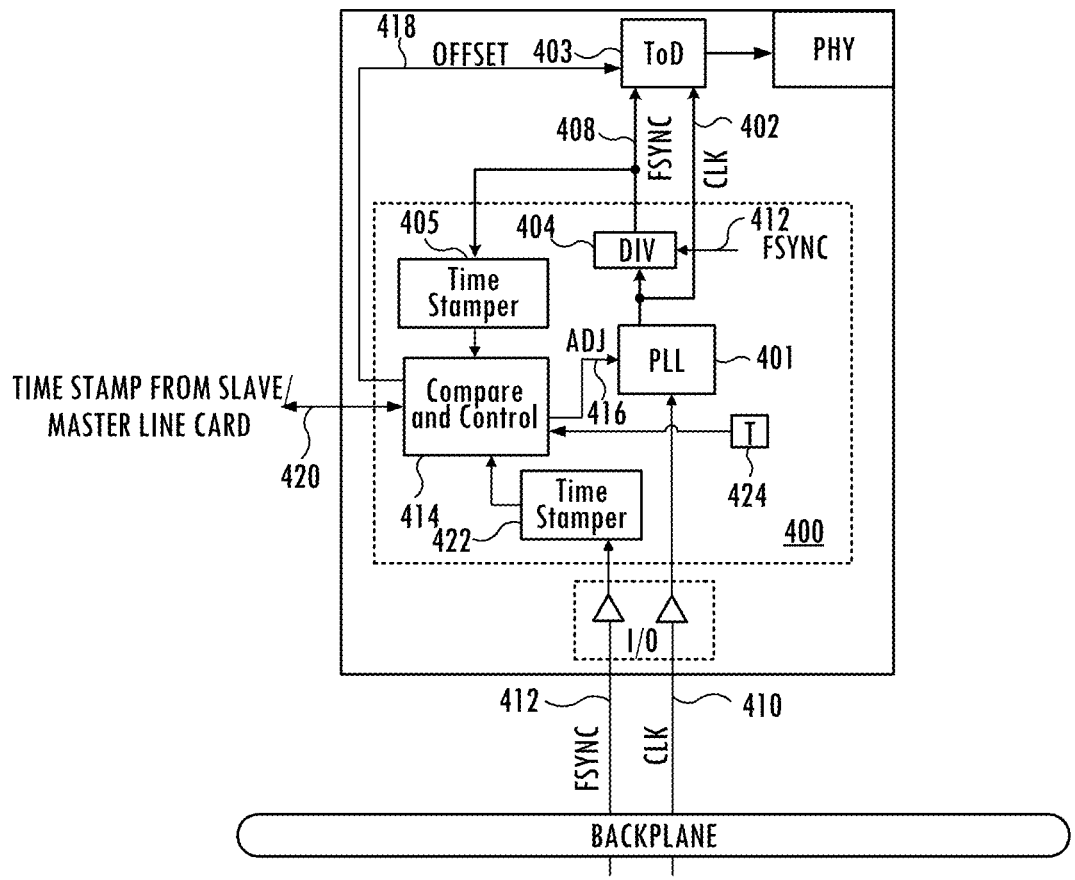
FIG. 4 illustrates a line card (master or slave) according to an embodiment that compensates for temperature variation to reduce CTE.

FIG. 4 illustrates a line card (master or slave) according to an embodiment that compensates for temperature variation and reduces CTE. Note that the master line cards utilize mismatch tracking to compensate for temperature variation while the slave line card utilizes the PTP loop to remain locked to the network timing. Each line card includes an integrated circuit 400 that includes a phase-locked loop 401 that generates a clock signal 402 for the local ToD counter 403 (corresponding to ToD 111 in FIG. 1). In addition, divider 404 divides down the generated clock signal to generate the local FSYNC signal 408 that is the rollover signal for ToD 403. In addition, the FSYNC signal 408 is fed back to time stamper 405. In an embodiment the divider 404 counts N locally generated CLK cycles and then issues a pulse (FSYNC) indicating the N count has been reached. The counter then resets and counts again, thus issuing a pulse every N cycles of CLK 402. The master timing card (see FIG. 1) distributes the global CLK signal 410 and the global FSYNC signal 412 over the backplane to each line card. The PLL 401 on the integrated circuit 400 utilizes the CLK signal 410 as the PLL reference clock signal. The global FSYNC signal 412 is used conceptually to control the divider 404 to align the locally generated FSYNC signal with the global FSYNC signal 412 distributed over the backplane. In an embodiment, the global FSYNC signal 412 is time stamped in time stamper 422, which provides the time stamp to compare and control logic 414. That compare may be used to adjust the PLL 401 to align the local FSYNC signal 408 and the global FSYNC signal 412. The goal is to ensure a zero delay between the global FSYNC and the local FSYNC. That goal can be modified as described herein to improve system FSYNC accuracy across line cards. The global FSYNC signal 412 can also be used to ensure divider 404 restarts its count of the PLL at the right time and with the right value.

In order to compensate for temperature change, different temperature coefficients, and different temperatures within the network communications box, the line cards in the illustrated embodiment time stamp the local FSYNC signal 408 in time stamper 405. Thus, each master line card determines a master line card FSYNC time stamp and the slave line card determines a slave line card FSYNC time stamp. Each master line card (or the slave line card) determines a baseline time stamp difference (baseline mismatch) between the slave line card FSYNC time stamp and the master line card FSYNC time stamp in time stamp compare and control logic 414. The baseline difference between each of the master line cards and the slave line card is likely to be different. The time stamp compare logic resides on either the slave line card or on each master line card. If the compare logic resides on the slave line card, the master line cards send their time stamp information to the slave line card for the compare operation. If the compare logic resides on the master line card, the slave line card sends its time stamp information to the master line cards for the compare operation to establish the baseline difference. Periodically, e.g., every 1 second (or longer or shorter according the needs of the particular system), the slave line card and each of the master line cards time stamp a currently generated FSYNC and determine a current difference between the slave line card generated FSYNC and the master line card generated FSYNC. The slave line card is locked to the network timing of the incoming data stream (the Grandmaster) but the master line cards are running open loop. The current time stamp difference is compared to the baseline time stamp difference and if the compare result indicates the difference has remained constant, no action need be taken. However, if the compare result is non-zero thereby indicating a mismatch difference, the timing of master line card is out of sync with the timing of the slave line card. In an embodiment, the master line card compensates for the mismatch difference by adjusting PLL 401 based on the non-zero compare result (the mismatch difference) to cause the compare result (mismatch difference) to return to zero. In that way, as temperature changes, the master line cards adjust their PLL timing to reduce CTE. Note that if there is a mismatch difference, mismatch compensation accounts for the unequal delays caused by, e.g., temperature variation between line cards of the I/O buffers and backplane buffers. The mismatch compensation can result in the delay between global FSYNC 412 and local FSYNC 408 being non-zero. The mismatch compensation helps ensure that local FSYNCs occur at the same time across line cards given different temperatures and delays associated with different line cards.

Alternatively, to compensate for the mismatch difference, the master line card supplies an offset 418 to the time of day counter 403 with the offset corresponding to the non-zero compare results (mismatch difference). The offset can be positive or negative. Thus, ToD counter 403 counts the next interval between FSYNC pulses to be shorter or longer based on the offset. That may be a particularly useful approach if the ToD counter is located on the same integrated circuit with the PLL and the compare logic measuring the time stamp differences but in other embodiments the ToD counter is located on another integrated circuit in the line card. Thus, the non-zero compare results can be compensated for in several ways, e.g., by adjusting the master line card PLL or supplying an offset to the ToD counter.

Figure 5:
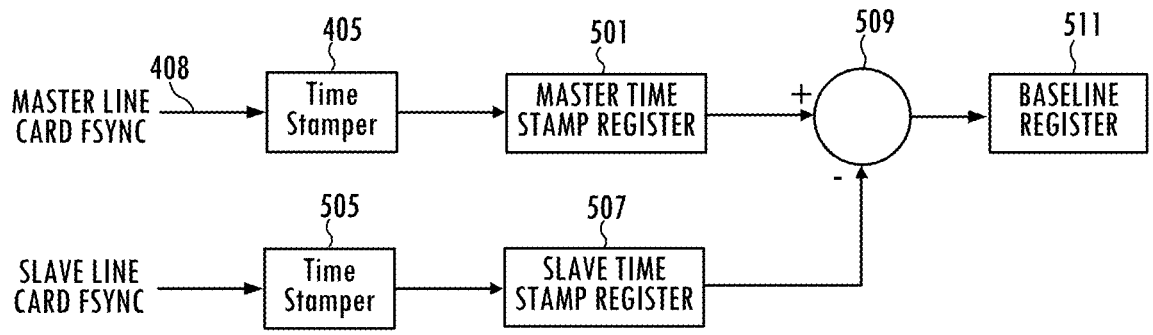
FIG. 5 illustrates the time stamp compare operation that establishes the baseline difference between a slave line card FSYNC time stamp and a master line card FSYNC time stamp.

FIG. 5 illustrates the time stamp compare operation that establishes the baseline difference between a slave line card FSYNC time stamp and a master line card FSYNC time stamp. Assume FIG. 4 illustrates a master line card and the compare logic resides in each of the master line cards. In an embodiment, the compare and control logic 414 is implemented as digital logic in integrated circuit 400 or programmable logic (e.g., a microcontroller unit (MCU)) or in any appropriate combination of programmable and digital logic in integrated circuit 400 or elsewhere on the master line card. Time stamper 405 receives the feedback of FYSNC signal 408 generated on the master line card and supplies the time stamp to a time stamp register 501 on the master line card. The slave line card has identical hardware shown as time stamper 505 receiving the feedback of the locally generated FSYNC signal and stores the time stamp in the slave time stamp register 507. The two time stamps are compared in the subtraction circuit 509 and the baseline difference in the timestamps is stored in the baseline time stamp register 511. If the compare logic is in the master line cards, the slave line card sends the time stamp information to each of the master line cards. A serial bus 420 (see FIG. 4) carries the time stamp information and other control information. In an embodiment, the slave line card broadcasts the time stamp information to all of the master line cards. If the compare logic is in the slave line card, the slave line card receives the master line card time stamps, performs the compare for each master line card, and stores the baseline differences for all the master line cards.

Figure 6:
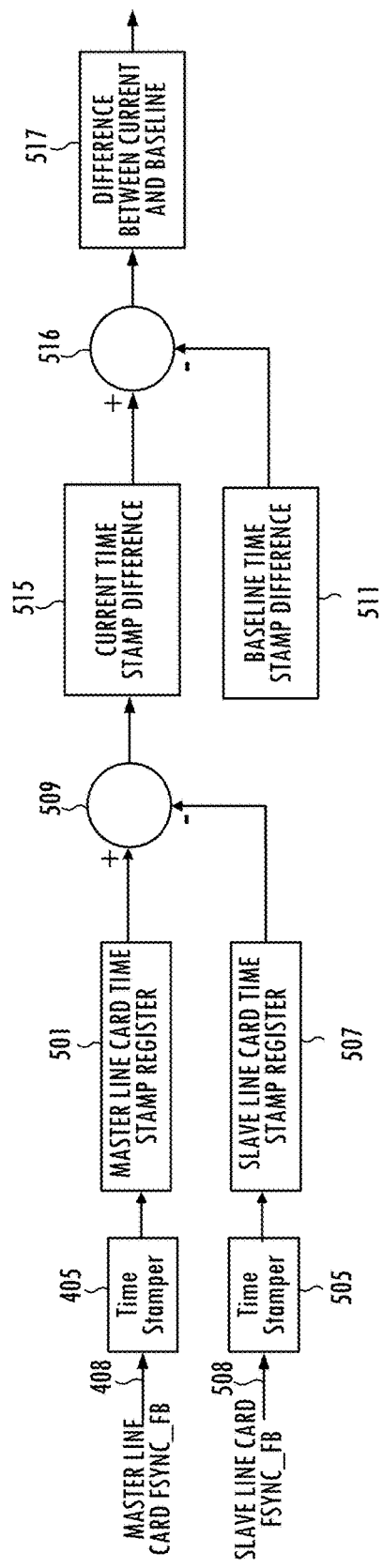
FIG. 6 illustrates the tracking operation to compare current time stamp differences to the baseline time stamp difference.

Once the baseline difference between the master line card and the slave line card time stamps is established, the current difference (mismatch) is tracked in order to compensate for temperature. FIG. 6 illustrates the tracking operation. Time stamper 405 time stamps a current local FSYNC 408 and stores the time stamp result in the master line card time stamp register 501. The slave line card time stamps the local slave line card FSYNC in time stamper 505 and stores the time stamp in slave line card time stamp register 507. Compare logic (subtraction circuit) 509 compares the two time stamps and generates a current time stamp difference 515. Compare logic 516 compares the current difference and the baseline difference and supplies the difference. That difference determines an adjustment 416 to PLL 401 (see FIG. 4) to zero out the difference from the baseline difference or the difference determines the offset 418. If the slave line card does the compares, the slave line card sends the respective difference to the appropriate master line card.

Figure 7:
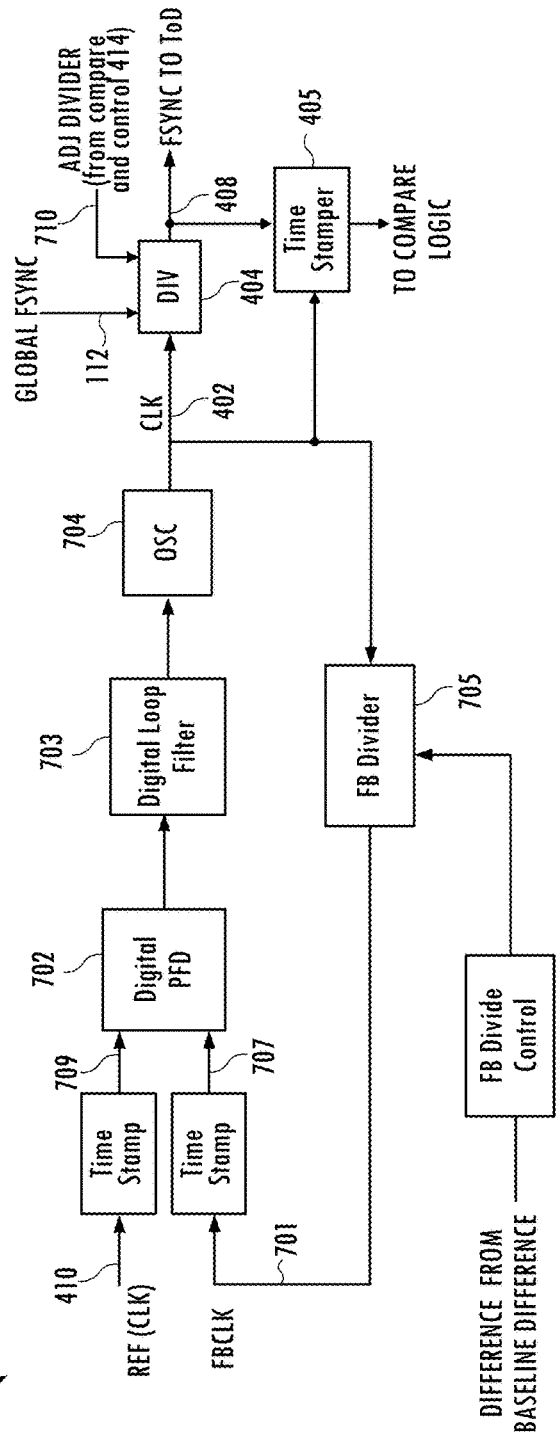
FIG. 7 illustrates a high level block diagram of an embodiment of a phase-locked loop used on the line cards (master and slave).

FIG. 7 illustrates a high level block diagram of a phase-locked loop 700 utilized in an embodiment of PLL 401. The illustrated PLL is a digital PLL that time stamps the reference clock from CLK 410 and the feedback clock (FBCLK) 701 and supplies the time stamps to a digital phase and frequency detector (PFD) 702. Since the PLL 700 receives the distributed clock signal as a reference clock, the PLL is frequency locked to the CLK signal. Thus, all the master line cards (along with the slave line card) are frequency locked to the CLK signal and the time stampers are all frequency locked since the PLL are frequency locked. Once PLL 700 is locked to CLK 410, divider 404 generates the FSYNC signal 408 that is looped back to time stamper 405. In an embodiment, the PLL 700 has a loop bandwidth of between, e.g., 40 Hz and 100 Hz. The digital PFD 702 supplies the phase difference to digital loop filter 703, that in turn controls the oscillator 704. In an embodiment, the oscillator 704 is a voltage controlled oscillator (VCO) that supplies a 1 GHz clock signal while the backplane distributed reference clock signal (CLK) 410 from the master timing card is, e.g., 10 MHz. Those frequencies are simply examples and in other embodiments, the frequencies of the distributed CLK signal and the VCO generated clock signal 402 are different. In an embodiment the time stamper 405 on the master line card (and 505 for the slave line card) is clocked by the output of the VCO 704. In an embodiment the time stamper 405 (and 505) is implemented as a high precision time to digital converter such as one described in the patent entitled "USE OF A RECIRCULATING DELAY LINE WITH A TIME-TO-DIGITAL CONVERTER", U.S. Pat. No. 10,067,478, which patent is incorporated herein by reference.

There are several ways that the PLL 700 can be adjusted based on the difference between the current time stamp mismatch and the baseline time stamp mismatch. Referring still to FIG. 7, the PLL can be adjusted by adjusting the feedback divider 705. In other embodiments in which the PFD 702 receives digital values, the adjustment can be made by adjusting the digital time stamp 707 of the feedback clock being supplied to the PFD 702 or the digital time stamp 709 of the reference clock signal with an offset corresponding to the difference. In still other embodiments, by way of example, a non-integer output divider (not shown in FIG. 7) is adjusted, output divider 404 is adjusted, or an I/O delay offset is changed. The correction is preferably applied slowly to zero out the difference between the current mismatch and the baseline mismatch so as not to cause an undesirable large perturbation to the VCO output signal or other signals based on the VCO output signal.

Figure 8:
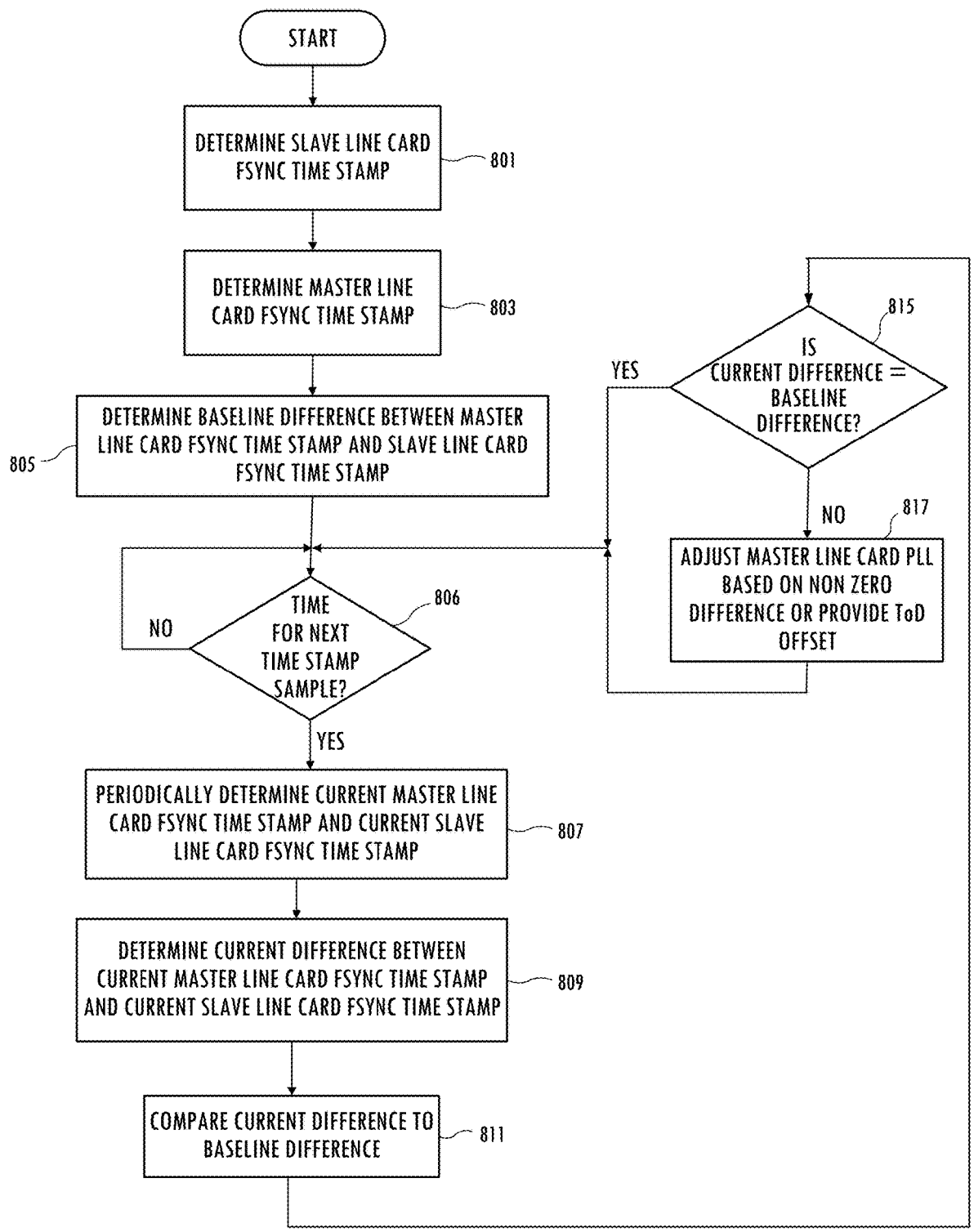
FIG. 8 illustrates a flow diagram for tracking the time stamp differences to reduce CTE in network communication boxes.

FIG. 8 illustrates a flow chart for tracking the time stamp differences to reduce CTE in network communication boxes. In 801, responsive to a power on condition and after the local PLL has locked to the CLK signal and the timing of the incoming data stream, or responsive to another selected time point, the slave line card determines a time stamp for the locally generated FSYNC signal. At 803, responsive to a power on condition and after the local PLL has locked to the CLK signal, or responsive to another selected time point, each of the master line cards determines a time stamp for the locally generated FSYNC. Then, either the master line cards send the time stamps to the slave line card or the slave line card sends the time stamp to the master line cards, e.g., in a broadcast operation. In 805 each of the master line cards (or the slave line card) determines a baseline difference between the FSYNC time stamp of the slave line card and the FSYNC time stamp of the master timing card and stores the baseline difference (baseline mismatch) for use in tracking. Alternatively, the slave line card determines and stores the baseline difference for each of the master line cards. In 806, the line cards wait a predetermined amount of time before the next time stamps are compared. Once the predetermined time period has passed, in 807, each of the master line cards periodically determines, e.g., once every 1 second, a current master line card FSYNC time stamp and the slave line card periodically determines a current slave line card FSYNC time stamp. Either each of the master line cards send the slave line card the current master line card FSYNC time stamp or the slave line card sends the master line cards the current slave line card FSYNC time stamp. In 809 the current difference between master and slave time stamps is determined and compared in 811 to the baseline difference.

If the slave line card performs all the compares for the master line cards to determine whether the current time stamp differs from the baseline time stamp, the slave line card sends the master line cards the results of the compare or at least the results of the compare that require the PLL on the master line card to be adjusted or require an offset to the ToD counter. Less traffic will result on the bus if the compares are distributed and performed on the master line cards since that is where the compare results will be utilized. In 815 each of the master line cards (or the slave line card) checks if the current difference and baseline difference are the same. Note that the change from the baseline difference can be positive or negative. If the compare result is non-zero indicating a mismatch difference (i.e., the current difference between master time stamp and slave time stamp is not equal to the baseline difference), the path delays between the slave line card and the master line card have changed likely due to temperature and in 817 the master line card adjusts its PLL based on the non-zero difference to eliminate the non-zero difference by, e.g., adjusting a phase of the master line card PLL according to the non-zero difference or adjusting other PLL parameters (e.g., divider values, etc.) described earlier. For example, assume the slave line card time stamp was initially 100 and the master line card initial time stamp was 200 and thus the baseline difference was 100. Assume for one of the periodic checks, the master line card time stamp was 1201 and the slave line card was 1100 and thus the current difference is 101. That implies the master line card has less delay since the count moved forward and the PLL should be adjusted to account for the delay change and match the baseline difference of 100. Less delay can be the result of, e.g., the master line card being in a cooler location in the network communications box, a different temperature coefficient, or both. Alternatively, rather than adjusting the PLL in 817, the master line card supplies an offset to the ToD counter with the offset corresponding to the mismatch difference (non-zero difference between the baseline difference and the current difference). The flow then returns to 806 to periodically wait for the next periodic time stamp compare. If the difference between the current difference and the baseline difference is zero in 815 (differences are equal) no action needs to be taken to adjust the master line card PLL and the flow returns to 806 to wait for the next periodic check.

In an embodiment the system includes a temperature sensor 424 (see FIG. 4) in each line card in the system, and the temperature readings are stored in a table in or accessible to compare and control logic 414. Assume each line card is calibrated at, e.g., 25° C. As the temperature changes and the mismatch is tracked resulting in adjustments to the master line card to compensate for the mismatches, a temperature coefficient is calculated for each master line card that specifies, e.g., how much compensation should be used per degree change in temperature, and that temperature coefficient can be used independently by each master line card along with mismatch tracking. Each master line card looks up the compensation value based on its current temperature and applies it to compensate for a temperature change. Use of the temperature coefficient by the master line cards can reduce the frequency of the mismatch tracking and reduce the size of the mismatch. In addition, the use of the temperature sensor and compensation using the temperature coefficient helps to keep the mismatch low in case of inter card communication failure or limitations in bandwidth.

While time stamping is one way to track the mismatch, other mechanisms can be used for mismatch tracking. For example, another approach uses analog or digital phase and frequency detectors (PFDs). The analog or digital PFDs utilize additional physical signaling so the rising edge of the FSYNCs can be compared in the PFD. In addition, PFD output should account for mismatch created by the additional physical signaling. In another alternative, messaging and calibration algorithms can be used in the packets sent between the slave line card and the various master line cards. The calibration using messaging involves sending a single or multiple calibration packets with time stamps (indicating when the packets are sent) through all the line card ports and calculation of the mismatch using the timestamps. The calculated mismatch is then corrected through the master line card PLL or an offset is provided to on the master line card ToD counter.

Thus, a way to reduce CTE for the communication box has been described by comparing a current time stamp difference to a baseline time stamp difference for each of the master line cards and adjusting a master line card PLL according to the compare. The description of the invention set forth herein is illustrative and is not intended to limit the scope of the invention as set forth in the following claims. Variations and modifications of the embodiments disclosed herein may be made based on the description set forth herein, without departing from the scope of the invention as set forth in the following claims.

What is claimed is:

1. A network communications system comprising:
a master line card configured to generate a plurality of master line card time stamps for a respective plurality of master line card frame sync signals generated on a master line card;
a slave line card configured to generate a plurality of slave line card time stamps for a respective plurality of slave line card frame sync signals generated on the slave line card;
a processor configured to compare at least some of the plurality of slave line card time stamps to at least some of the plurality of master line card time stamps, to adjust at least one timing aspect of the master line card based on the comparison, to determine a temperature coefficient for the master line card, and to compensate for temperature change based on the temperature coefficient and a current temperature reading.

2. The network communications system as recited in claim 1 wherein the master line card includes the processor.

3. The network communications system as recited in claim 1 wherein the slave line card further includes the processor.

4. The network communications system as recited in claim 1 wherein the processor is implemented by an integrated circuit or a programmable logic, or a combination thereof.

5. The network communications system as recited in claim 1 wherein the processor performs the adjustment of the at least one timing aspect at least by adjusting a phase-locked loop of the master line card.

6. The network communications system as recited in claim 1 wherein the processor performs the adjustment of the at least one timing aspect at least by providing an offset to a counter.

7. The network communications system as recited in claim 1 wherein the processor compensates for temperature change based on the temperature coefficient and a current temperature reading at least by adjusting at least one timing aspect of the master line card.

8. A network communications system comprising:
a master line card configured to generate a plurality of master line card frame sync signals including a first master line card frame sync signal and a second master line card frame sync signal;
a slave line card configured to generate a plurality of slave line card frame sync signals including a first slave line card frame sync signal and a second slave line card frame sync signal;
a processor configured to generate a baseline difference between the first slave line card frame sync signal and the first master line card frame sync signal, to generate a second difference between the second slave line card frame sync signal and the second master line card frame sync signal, and to adjust at least one timing aspect of the master line card to compensate for the second difference not being equal to the baseline difference.

9. The network communications system as recited in claim 8 wherein the processor is disposed in the master line card.

10. The network communications system as recited in claim 8 wherein the processor is disposed in the slave line card.

11. The network communications system as recited in claim 8 wherein the processor is implemented by an integrated circuit or a programmable logic, or a combination thereof.

12. The network communications system as recited in claim 8 wherein the processor performs the adjustment of the at least one timing aspect at least by adjusting a phase-locked loop of the master line card.

13. The network communications system as recited in claim 8 wherein the processor performs the adjustment of the at least one timing aspect at least by providing an offset to a counter.

14. A network communications system comprising:
a master line card configured to generate a plurality of master line card time stamps corresponding to a respective plurality of master line card frame sync signals;
a slave line card configured to generate a plurality of slave line card time stamps corresponding to a respective plurality of slave line card frame sync signals;
a processor configured to compare at least some of the plurality of slave line card time stamps to at least some of the plurality of master line card time stamps, and to adjust at least one timing aspect of the master line card based on the comparison.

15. The network communications system as recited in claim 14 wherein the processor is disposed in the master line card.

16. The network communications system as recited in claim 14 wherein the processor is disposed in the slave line card.

17. The network communications system as recited in claim 14 wherein the processor is implemented by an integrated circuit or a programmable logic, or a combination thereof.

18. The network communications system as recited in claim 14 wherein the adjustment of the at least one timing aspect is an adjustment of a phase-locked loop of the master line card.

19. The network communications system as recited in claim 14 wherein the adjustment of the at least one timing aspect includes an adjustment of an offset of a time of day counter.

* * * * *